Aug. 11, 1953  J. D. RUSSELL  2,648,413
BRAKING SYSTEM
Filed Oct. 15, 1949  2 Sheets-Sheet 1

INVENTOR.
JOHN D. RUSSELL,
BY
James B. Christie
ATTORNEY.

Aug. 11, 1953   J. D. RUSSELL   2,648,413
BRAKING SYSTEM
Filed Oct. 15, 1949   2 Sheets-Sheet 2
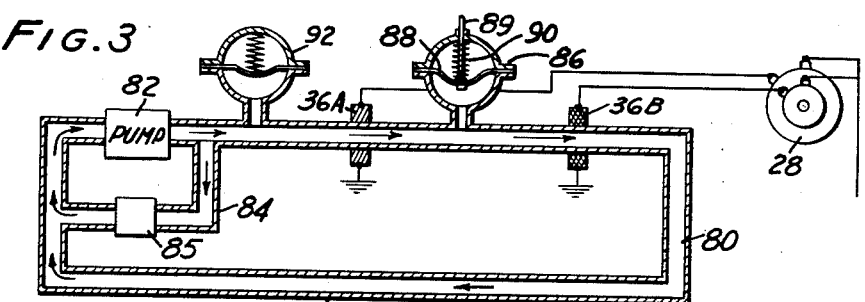
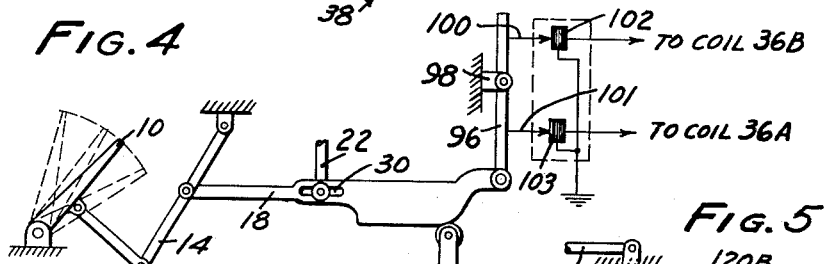
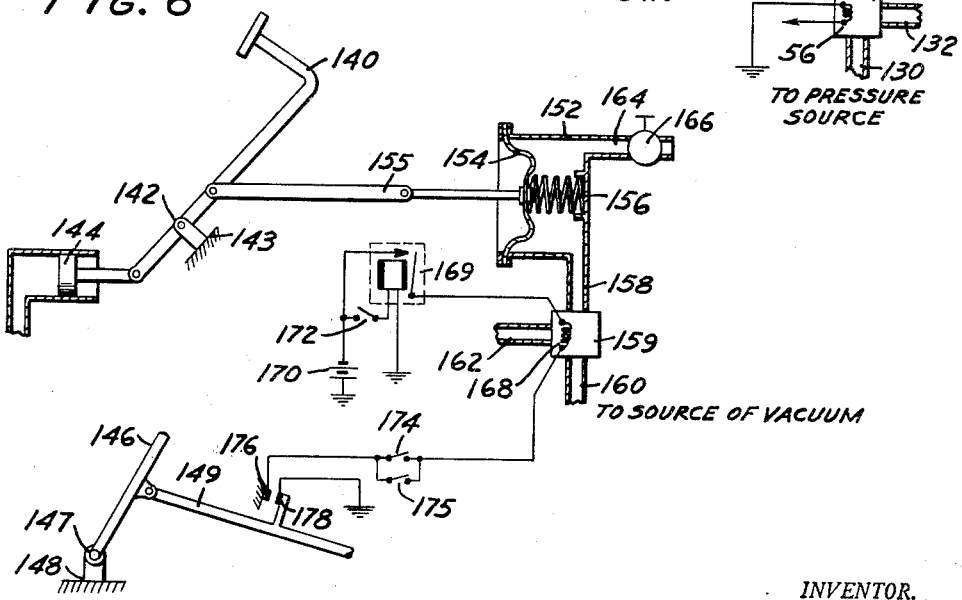
INVENTOR.
JOHN D. RUSSELL,
BY
ATTORNEY.

Patented Aug. 11, 1953

2,648,413

UNITED STATES PATENT OFFICE 2,648,413

BRAKING SYSTEM

John D. Russell, Los Angeles, Calif.

Application October 15, 1949, Serial No. 121,546

2 Claims. (Cl. 192—3)

This invention relates to vehicle braking systems and more particularly to automatic control means for such braking systems.

The conventional motor vehicle, as for example an automobile, has a braking system including brake shoes or other braking means associated with at least two, but more generally four of its wheels, a brake pedal located in the automobile cab, hydraulic, mechanical or other means operable responsive to depression of the brake pedal to apply the separate braking means at each wheel, and an emergency brake operable from the cab to apply the braking means on two or more of the wheels independently of the brake pedal.

I have now developed a brake control system which operates automatically to set the brakes, which may be of any conventional type. The control system of the invention may be used independently or in conjunction with the conventional brake operating means and brake pedal. In one form, the invention provides (1) an automatic emergency brake control which applies the emergency brakes when the motor is stopped, (2) an automatic control of all of the brakes responsive to manipulation of the throttle control or accelerator pedal, (3) automatic hill holding independent of the degree of incline or the direction of travel and (4) a manually operated control to adjust the sensitivity of the automatic brake control system.

In one embodiment, the invention contemplates in a motor vehicle having an accelerator pedal to control the speed of the vehicle motor, and braking means associated with the vehicle wheels, the combination comprising a source of electrical energy, means operable by movement of the accelerator pedal to initiate energy output from the source to apply the braking means. In a preferred embodiment, the energy output of the source is not only initiated by movement of the accelerator pedal but is also varied responsive to the magnitude of pedal movement, and the means for applying the brakes responsive to the output of the source varies the braking force applied in proportion to the variation in the energy output of the source.

A feature of the brake control system of the invention is its complete independence from existing brake control means and the complete absence of interference between the two. If the operator of a motor vehicle desires to employ the conventional brake pedal, additional braking may be achieved although the brakes will have been applied automatically before he will have been able to place his foot on the brake pedal. Moreover, the sensitivity of the automatic control system may be varied by a manually operated control as described above and the same control may be used to cut out the automatic control system completely, if desired.

The ultimate aim of the invention is to make possible the elimination of the conventional brake pedal altogether and make all braking automatic with movement of the accelerator pedal. This is in line with the present trend of automatic transmissions which have successfully eliminated the clutch pedal. By elimination of the brake pedal, the operator is left with a single foot pedal performing both the accelerating and braking functions.

The invention will be more clearly understood with reference to the following detailed description taken in conjunction with the accompanying drawings wherein:

Fig. 3 is a diagram of an alternative means of applying the brakes responsive to the output of the energy source;

Fig. 4 is a diagram of a portion of the system showing a particular type of energy source and its operation responsive to movement of the accelerator pedal;

Fig. 5 is a detailed diagrammatic illustration of the automatic emergency brake system as forming a part of the complete system of Fig. 1; and Fig. 6 is a diagrammatic illustration of a simplified system for initiating output of the energy source responsive to movement of the pedal and the application of this output to energize the brake system.

Figure 1:
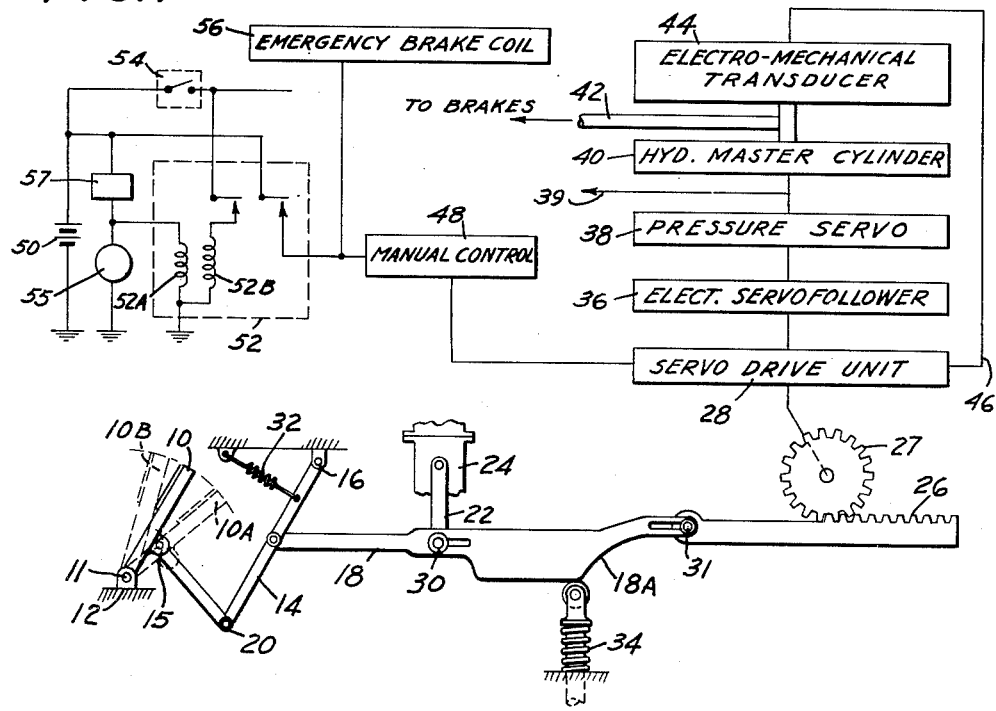
Fig. 1 is a block diagram of a complete system in accordance with the invention.

Referring to Fig. 1, there is shown in diagram a conventional accelerator pedal 10, pivotally mounted at 11 to a floor 12, say of an automobile. The pedal can be rotated about the pivot point 11 through an angle approximately defined by the phantom positions 10A, 10B of the pedal. A toggle arrangement 14 is pivotally mounted at one end to the back of pedal 10 at 15 and is pivotally mounted at its opposite end to a stationary support 16. A throttle arm 18 is pivotally mounted to the toggle intermediate the support 16 and knee 20 of the toggle and connects to a butterfly valve arm 22 forming a part of carburetor 24.

The throttle arm 13 is extended beyond the butterfly arm 22 and through the medium of a rack 26 and pinion 27 controls a so-called servo-drive unit 28. Both butterfly arm 22 and rack 26 are connected to the throttle arm through slots 30, 31 respectively oriented with respect to each other so that during the movement of the accelerator 10 in the range defined by position 10A, the rack and pinion are inoperative and during the movement of the pedal 10 in the range defined by position 10B, the butterfly valve is not affected.

Looking at the pedal 10, depression towards the right to the phantom position 10A actuates the butterfly arm 22 without movement of the rack 26. Return of the pedal from the position 10A to the illustrated position actuates the butterfly arm in the opposite direction, still without moving the rack 26. Rotation of the pedal 10 in the opposite direction to the phantom position 10B shifts the rack 26 to the left thereby rotating pinion 27 and return of the pedal to the intermediate position 10 shifts the rack 26 in the opposite direction, the entire rack shifting procedure taking place without change in the butterfly valve setting.

A spring 32 loads the toggle 14 against depression of pedal 10 to the position 10A and a spring loaded roller 34 engaging against an inclined face 18A of the throttle control arm 18 urges pedal 10 once it is in the intermediate position to the position 10B. Thus, considering the position of the pedal as illustrated in solid lines as an intermediate position, movement thereof between this position and the position 10A controls the vehicle acceleration whereas movement between this position and the position 10B controls the vehicle braking independent of acceleration.

The servo-drive unit 28 comprises a source of electrical energy preferably variable responsive to the angular rotation of pinion 27. An electrical servo follower 36 is connected to the output of the servo-drive unit 28 and comprises electrically operated means for applying the brakes either directly or indirectly. Thus, if the braking system happens to be electrical it may be operated directly responsive to the electrical servo follower 36. However, if the braking system is hydraulic which is normally the case, a pressure servo 38 is connected to the electrical servo follower and is operated thereby to apply the brakes directly as indicated by arrow 39 or to apply pressure to the master cylinder 40 of the hydraulic braking system which is transmitted through the normal hydraulic line 42 to the brakes.

In a preferred embodiment, the automatic control system includes an electro-mechanical transducer 44 operable responsive to pressure applied thereto from the hydraulic master cylinder 40 to feed back an electrical signal to the servo-drive unit 28 by means of a lead 46. This feedback serves to stabilize the automatic control by applying a signal to the drive unit opposite to that developed responsive to rotation of the pinion gear 27. When the operator of the automobile applies pressure to the master cylinder by depression of the conventional brake pedal, this pressure may be of such magnitude as to develop a feedback signal in the transducer 44 sufficient to cancel out the output of the servo-drive unit 28 and hence to cancel the operation of the automatic brake control.

The energy input into the servo-drive unit 28 is determined by a manual control means 48 which may be a simple rheostat or potentiometer operable by a control knob in the automobile cab. The supply of energy through the control 48 to the servo-drive unit is in turn derived from battery 50 of the automobile through a relay 52 operable responsive to the position of the automobile ignition switch 54 and generator 55 in such a fashion that the control system is dead, i. e. there is no current flow from battery 50 through relay 52, manual control 58 and the servo-drive unit 28 when the ignition switch 54 is in the off position or when the ignition switch is on but the motor is not running. Relay 52 is a double coil double pole relay, the two coils 52A, 52B being separately energized through different circuits. When the ignition switch is turned on, before the motor is started there is no current through either coil. When the motor is started generator 55 closes relay 57 to energize coil 52A. This closes both contacts of relay 52 completing the circuit from battery 50 to the servo-drive unit and also completing the circuit through coil 52B. With coil 52B energized, the circuit will remain closed even though the motor stops until ignition switch 54 is turned off.

An automatic emergency brake system represented in the diagram by an emergency brake coil 56 is connected in the circuit between relay 52 and manual control 58 and is operative when there is no current flow between the relay and the manual control, i. e. when the ignition switch is off and becomes inoperative when the ignition switch is turned on and the motor is started as above described.

The operation of the system of Fig. 1 is as follows: depression of pedal 10 in the direction of position 10A increases through displacement of butterfly arm 22 the speed of the vehicle motor, at the same time having no effect on the braking control system. Relaxation of the pressure on pedal 10 to allow it to return to the intermediate position decelerates the vehicle still without effect on the braking control system. Further relaxation of the foot pressure on foot pedal 10 allowing the pedal to travel in the direction of position 10B under the urging of spring loaded roller 34 causes the rack 26 to travel toward the left rotating pinion gear 27 clockwise. Assuming that the manual control means 48 is set to energize the servo-drive unit 28 and the circuit is closed through relay 52, rotation of pinion gear 27 will initiate electrical output from the drive unit 28 and in a preferred embodiment will vary this output responsive to the degree of rotation of the pinion gear.

As mentioned previously, the output of the servo-drive unit may be employed directly to apply the brakes in an electrical braking system. However, most motor vehicles are presently provided with hydraulic brakes and the invention is described primarily with relation to such braking means. The output of the servo-drive unit is fed into the electrical servo follower which may comprise a motor, a solenoid or an electro magnet as more fully explained hereinafter. These various expedients may be used directly on the hydraulic fluid to apply the brakes. In one embodiment, the electrical servo follower operates the pressure servo 38 which by one means or another hereinafter set forth develops a hydraulic pressure in the hydraulic master cylinder to apply the brakes. The pressure developed in the hydraulic master cylinder is transmitted through the existing fluid lines 42 to the brakes and a portion thereof is bled from these lines in the electro-mechanical transducer 44. The transducer 44 feeds an electrical signal of a magnitude proportional to the pressure applied thereto back to the servo-drive unit to oppose the output signal of the drive unit. The emergency brake system 56 is described in greater detail with respect to Figs. 5 and 6.

Figure 2:
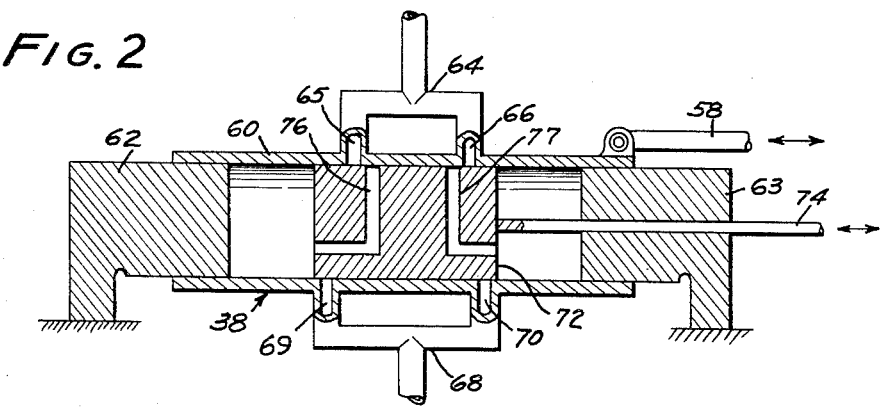
Fig. 2 is a diagrammatic sectional elevation of one means for applying the brakes through the application of pressure developed responsive to the output of the energy source.

In Fig. 2, there is shown one type of pressure servo operable responsive to the output of the electrical servo follower, the electrical servo follower 36 being in this case a motor (not shown) operative to oscillate shaft 58 which in turn operates the pressure servo 38. The pressure servo illustrated in Fig. 2 comprises a cylinder 60 slidably mounted on two stationary pistons 62, 63 sealing the opposite ends of the cylinder 60. A source of pressure (not shown) as for example the oil system of the vehicle is connected by a manifold 64 and ports 65, 66 to the cylinder. A pressure exhaust manifold 68 is connected to the cylinder through ports 69, 70 providing means for bleeding pressure from the cylinder. In case the oil system of the vehicle is tapped as the pressure source, the manifold 68 may exhaust the pressure directly into the crankcase (not shown). A piston 72 is slidably mounted within cylinder 60 between the stationary pistons 62, 63 and is connected by piston rod 74 to the existing piston (not shown) in the hydraulic master cylinder 40 (see Fig. 1). The piston 72 is provided with ports 76, 77 opening into the cylinder at opposite ends of the piston and alignable with ports 65, 66 respectively in the cylinder wall. In operation, energy output from the servo-drive unit applied to the electrical servo follower, in this case a motor, causes the motor to shift the shaft 58 towards the right (as viewed in Fig. 2) displacing the cylinder to align the port 65 in the cylinder with the port 76 in the piston 72. Pressure, say oil pressure, is thus introduced to the cylinder on the left hand side of the piston 72 at the same time displacing port 70 so as to bleed pressure from the inside of the cylinder on the right of piston 72. Pressure introduced on the left of the piston 72 causes the piston to travel towards the right, applying through piston rod 74, a pressure on the hydraulic system. Piston 72 thus follows cylinder 60, the displacement of which is proportional to the rotation of pinion 27. When the electrical servo motor is reversed responsive to reversal of the pinion 27, the operation of the pressure servo 38 is likewise reversed, pressure being introduced on the right hand side of piston 72 and exhausted from the left hand side of piston 72. This retracts the piston in the hydraulic master cylinder through the medium of piston rod 74 and releases the brakes.

In a simplified system employing the pressure servo follower of Fig. 2, the shaft 58 may be connected through suitable mechanical linkage to the throttle arm 18. In such a system all electrical components are eliminated but at the same time sensitivity adjustment is rendered more difficult.

Another type of pressure servo is illustrated diagrammatically in Fig. 3. In this figure, the servo-drive unit 38 is of the type hereinafter described with reference to Fig. 4 and the output of the drive unit is applied to electrical servo follower 36 (as shown in Fig. 1) which in this particular embodiment comprises coils 36A, 36B. The pressure servo 38 (see Fig. 1 for the relationship of the pressure servo to the servo-drive unit and electrical servo follower) comprises a self contained hydraulic circuit consisting of a hydraulic fluid line 80 connected to the input and output of a pump 82 and a bypass 84 short circuiting the fluid line 80 through a control valve 85. The coils 36A, 36B, are placed around the line 80 on opposite sides of a pressure chamber 86 opening into the line 80. The pressure chamber 86 contains a diaphragm 88, a shaft 89 connected at one end to the diaphragm and extending through a wall of the chamber 86 and a helical spring 90 mounted around the shaft 89 and loading the shaft downwardly as viewed in the drawing.

The hydraulic system including line 80, pump 82 and bypass 84 is filled with a magnetic fluid i. e. a fluid oil having suspended therein a quantity of iron particles. A fluid of this type is characterized by a sudden increase in viscosity under the influence of and proportional to the strength of an applied magnetic field.

In the apparatus of Fig. 3, such a magnetic field may be induced in the fluid by either of coils 36A or 36B. If the servo-drive 28 is operated to energize the coil 36B the viscosity of the magnetic fluid adjacent the coil 36B increases markedly and a preselected portion of the pressure developed by pump 82 is transmitted into the pressure chamber 86. This pressure distorts diaphragm 88 thereby displacing the shaft 89. By connecting the shaft 89 to the regular hydraulic master cylinder piston, or to an auxiliary master cylinder piston the brakes will be applied in the automobile responsive to distortion of the diaphragm 88. The amount of pressure applied to the pressure chamber 86 responsive to energization of coil 86B will be a function of the capacity of pump 82 and the setting of the bypass control valve 85 as well as the strength of the magnetic field. Any desired proportion of the pump output pressure may be short circuited to the pump inlet through the bypass 84. When the servo-drive unit is oppositely actuated, coil 36B will be deenergized and coil 36A will be energized. Under these circumstances, the viscosity block in the hydraulic line 80 will be upstream from the pressure chamber 86 and the substantial flow of hydraulic fluid will be through bypass 84. Under these circumstances, there will be no pressure in chamber 86 and the spring 90 will retract shaft 89, thus relieving the brakes. An accumulator 92 is connected in the hydraulic line 80 intermediate the pump and first coil 36A and operates on the principle of a surge tank to smooth out operation of the system. The degree of braking may be adjusted to a desired value by proper proportioning of energization of coils 36A and 36B through the electrical servo-drive unit.

In the embodiment of Fig. 3, the particular servo-drive unit required includes one source of energy initiated responsive to movement of the throttle pedal in the braking range and another source of energy initiated responsive to motion of the throttle pedal in the accelerating range. With reference to Fig. 3, the energy output of the servo drive unit 28 initiated by and responsive to the motion of the throttle pedal in the braking range energizes coil 36B and deenergizes coil 36A in proportion to throttle movement upward whereas the output of the servo-drive unit initiated by and responsive to movement of the throttle pedal in the accelerating range energizes coil 36A and deenergizes coil 36B. Such a system is shown in somewhat greater detail in the diagram of Fig. 4.

In Fig. 4, throttle pedal 10 is again connected through a toggle 14 to a throttle control arm 18 operative to alter the position of butterfly valve arm 22. Butterfly arm 22 is connected to the throttle arm 18 through a slit 30 which permits motion of the throttle arm 18 in the braking range of pedal movement without effecting the throttle valve. A pivot arm 96 is connected at one end to the outer end of throttle arm 18 and is pivotally mounted intermediate its ends to a stationary support 98. In the particular embodiment shown in Fig. 4, the pivot arm 96 is connected by shafts 100, 101 on opposite sides of the pivot point 96 to a pair of carbon stacks 102, 103 respectively. The characteristic of carbon stacks of this type is a change in resistance inversely proportional to the compressive force applied thereto. By connecting a substantially constant source of electrical energy as for example the automobile battery, through stacks 102, 103 to the coils 36B, 36A respectively (see Fig. 3), the energy impressed on these coils is responsive to the compressive force applied to the stacks by movement of the lever arm 96. Thus when the throttle 10 is depressed in the accelerating range, the lever arm 96 pivots counterclockwise compressing stack 103 and relieving the pressure on stack 102. This decreases the resistance of stack 103 and increases the resistance of stack 102 to the point where coil 36A is energized and coil 36B is deenergized. Under these conditions, referring to Fig. 3, there is no pressure developed in the chamber 86 and no braking action takes place. When the pedal 10 is released beyond the intermediate position, being urged in the opposite direction by the spring loaded roller 34, the lever arm 96 rotates in clockwise direction with the result that coil 36B is energized and coil 36A is deenergized in proportion to the angular displacement of arm 96. Under these conditions pressure is applied to the chamber 86 actuating the brakes in the manner above described.

The carbon stacks 102, 103 are representative of any variable resistance device or variable energy output device as a rheostat, potentiometer or the like operable by mechanical movement responsive to rotation of the lever arm 96.

Returning to Fig. 3, the system there shown may be modified by elimination of valve 85 and shifting of coil 36A to the bypass 84. As thus changed the system is controlled by in-phase energization and deenergization of coils 36A and 36B. As a consequence a single current output from the servo-drive unit will suffice. Referring to Fig. 4 this means that carbon stack 103 may be omitted with both coils being connected to the stack 102.

The details of the automatic emergency brake system shown only as the emergency brake coil 56 in Fig. 1 are illustrated diagrammatically in Fig. 5. The emergency brake comprises a ratchet 106 pivotally mounted at 107 to a stationary support 108. The emergency brake lever 110 is pivotally mounted at 107 and is rotatable independently of the ratchet 106. As is conventional practice, the lever 110 is provided with a dog 112 engageable in the ratchet and connected through a latch arm 113 to a lever 114 projecting downwardly along the arm 110. Rotation of lever 114 towards the arm 110 releases dog 112 from the ratchet 106. A brake actuating cable 116 is connected to the upper end of arm 110 above pivot 107 so that clockwise rotation of arm 110 applies the emergency brakes through the cable 116 and counterclockwise rotation releases the brakes. A housing 120 is divided into two compartments 120A and 120B by a transverse diaphragm 122. A rod 124 is connected at one end to the diaphragm 122 and is carried through a wall of the housing 120 and pivotally affixed at its opposite end to the ratchet 106. In the particular embodiment shown, diaphragm 122 is spring loaded by a helical spring 126 which urges the diaphragm towards the left thereby pivoting ratchet 106 and brake handle 110 clockwise and applying the emergency brakes. An electrical valve 128 is connected through a conduit 129 to chamber 120A and through a conduit 130 to a vacuum source (not shown). Conveniently, the vacuum source is supplied by the vehicle motor. An air inlet line 132 is also connected to the valve 128. When the emergency brake coil 56 (in valve 130) is energized by turning on the ignition switch 54 and starting the motor (see Fig. 1) the valve 128 connects conduits 130 and 129 to partially evacuate the chamber 120A drawing the diaphragm 122 and conjunctively rod 124 to the right (as viewed in Fig. 5). The ratchet 106 and emergency brake handle 110 are thereby rotated counterclockwise to release the brakes through cable 116. When the ignition switch is turned off coil 56 is deenergized, valve 128 moves to connect conduits 128 and 129 allowing air to relieve the vacuum in chamber 120A and permitting spring 126 to force the diaphragm towards the left thereby applying the brakes. A breather port 124 opens into chamber 120B to permit intake and exhaust of air as the diaphragm 122 moves. The same arrangement can be used with a pressure source by connecting conduit 129 to chamber 120B, providing the exhaust port 124 in chamber 120A.

A simplified version of the invention is illustrated in Fig. 6 wherein automatic control is provided to the extent of on-off control of the brakes without the refinement of variable braking or variable sensitivity. The apparatus of Fig. 6 is associated with a conventional brake pedal 140 pivotally mounted at 142 to a stationary support 143 and operating a piston 144 in the hydraulic braking system through suitable and conventional linkage. Depression of the brake pedal 140 (towards the right in Fig. 6) forces piston 144 to the left to apply the brakes. A conventional accelerator pedal 146 is pivotally mounted at 147 to a stationary support 148 and controls the displacement of a throttle arm 149 pivotally mounted to the under side of the pedal. A housing 152 is provided with a diaphragm 154 connected by means of a rod 155 to the brake pedal 140. The diaphragm 154 is spring loaded with a spring 156 to urge the diaphragm outwardly with respect to the housing 152 i. e. against depression of brake pedal 140. The housing 152 is connected through a conduit 158 to an electrical valve 159 which is connected through a conduit 160 to a vacuum source and to atmosphere through a conduit 162. The housing 152 is also connected directly to atmosphere through a conduit 164 having a valve 166 disposed therein. The valve 159 is normally positioned to connect conduits 158 and 162 thereby venting the housing 152 to atmosphere.

The valve 159 is actuated by a coil 168 connected through a relay 169 to the automobile battery 170. The relay 169 is energized by closing ignition switch 172 to complete the circuit between the battery and one side of coil 168. The other side of coil 168 is connected through a pair of parallel coupled switches 174, 175 to a stationary contact 176 placed adjacent the throttle arm 149. The throttle arm 149 carries a grounded contact 178. Switch 174 is a manually operable switch conveniently located in the automobile cab by means of which the automatic braking control system may be cut out or not as desired. Switch 175 is a motion control switch which is closed only when the automobile is stopped. The purpose of the switch 175 will be made apparent from the following description of the operation of the system of Fig. 6.

With the switch 174 closed and the ignition switch 172 turned on, the circuit through electrical valve control coil 168 is completed from battery 170 to contact 176. While the automobile is being accelerated by foot pedal 146 contacts 176 and 178 are disengaged so that no current flows through coil 168. In this condition the chamber 152 is connected to atmosphere through valve 159 and conduit 162. When the pressure on the accelerator pedal 156 is released to the point where contacts 176 and 178 engage, current passing through coil 168 actuates valve 159 to connect chamber 152 through conduit 160 to a vacuum source (not shown). Evacuation of chamber 152 draws diaphragm 154 inwardly which, through shaft 155, rotates the brake pedal 140 clockwise to apply the brakes through piston 144.

As described above, the apparatus of Fig. 6 represents a simplified system wherein there is no electrical sensitivity control and the braking forces applied by manipulation of the throttle pedal 146 is substantially fixed. Some sensitivity control can be achieved by adjustment of valve 166 on the air vent 164. The braking forces applied being a function of the displacement of diaphragm 154 is thus a function of the degree of vacuum in chamber 152. Assuming a constant source of vacuum, the pressure in chamber 152 may be controlled by adjusting valve 166 to permit a small amount of air flow through conduit 164.

If it is desired to deactuate the automatic braking control system the manually operated switch 174 may be opened, in which case, except under circumstances hereinafter explained, no current will flow through coil 168 even upon engagement of contacts 176 and 178. By inclusion of a motion switch 175 in parallel with the manually controlled switch 174, automatic hill holding may be achieved independent of other automatic brake operations. The motion switch 175 is adjusted to close only when the automobile is stopped. Hence, when travelling up or down a hill, if the automobile is stopped by foot depression of pedal 140, the motion switch 175 will close and coil 168 will be energized by engagement of contacts 176, 178 until the throttle is depressed for renewed motion of the car.

A feature of the apparatus of Fig. 6 is that it functions independently of and at the same time in conjunction with the normal foot operated brake, thus, if the driver takes his foot off the throttle pedal, assuming switch 174 to be closed, to apply the brakes, braking action will take place, the extent of which depends upon the degree of vacuum and the setting of valve 166, even during the interval required to move his foot from throttle pedal 146 to brake pedal 140. If greater braking is required, the pedal 140 can be further depressed in the conventional manner.

Many modifications in the apparatus of the invention may occur to those skilled in the art, the invention being directed to an automatic braking control system in which the emergency brake operation is responsive to the ignition switch and motor and regular braking is obtained automatically responsive to manipulation of the accelerator throttle.

I claim:

1. In a motor vehicle having a battery, an accelerator pedal to control the speed of the vehicle motor, braking means associated with the vehicle wheels, and a brake pedal operable by depression to apply the braking means, the combination comprising a housing, a flexible spring-loaded diaphragm sealed across the housing and forming a chamber therein, a shaft connected at one end to said diaphragm and at the other end to said brake pedal, a source of vacuum, an electrically actuated valve operable to connect said chamber alternately to said source of vacuum and to atmosphere, a grounded electrical contact mounted to move responsive to motion of said accelerator pedal, a stationary electrical contact mounted in the path of motion of said grounded electrical contact, the stationary contact being connected through a manual control switch to one side of said electrically actuated valve, the other side of said electrically actuated valve being connected to said battery through a relay operable responsive to closing the vehicle ignition switch to close the circuit between said battery and said valve.

2. In a motor vehicle having a battery, an accelerator pedal to control the speed of the vehicle motor, braking means associated with the vehicle wheels, and a brake pedal operable by depression to apply the braking means, the combination comprising a housing, a flexible spring-loaded diaphragm sealed across the housing and forming a chamber therein, a shaft connected at one end to said diaphragm and at the other end to said brake pedal, a source of vacuum, an electrically actuated valve operable to connect said chamber alternately to said source of vacuum and to atmosphere, a grounded electrical contact mounted to move responsive to motion of said accelerator pedal, a stationary electrical contact mounted in the path of motion of said grounded electrical contact, the stationary contact being connected through a manual control switch to one side of said electrically actuated valve, the other side of said electrically actuated valve being connected to said battery through a relay operable responsive to closing the vehicle ignition switch to close the circuit between said battery and said valve, and a motion control switch connected in parallel to said manual control switch so that said valve is actuated automatically when the vehicle is stopped independent of the setting of said manual control switch.

JOHN D. RUSSELL.

References Cited in the file of this patent

UNITED STATES PATENTS

| Number | Name | Date |
|---|---|---|
| 1,635,873 | Woolson | July 12, 1927 |
| 1,682,308 | Schaede | Aug. 28, 1928 |
| 1,857,053 | Krotz | May 2, 1932 |
| 2,082,430 | Townsend | June 1, 1937 |
| 2,266,213 | Kattwinkel | Dec. 16, 1941 |
| 2,308,822 | Murphy | Jan. 19, 1943 |
| 2,334,611 | Darling | Nov. 16, 1943 |
| 2,387,716 | Chilton | Oct. 30, 1945 |
| 2,411,632 | Moren | Nov. 26, 1946 |
| 2,412,228 | Oetzel | Dec. 10, 1946 |